United States Patent
Voelker et al.

(10) Patent No.: US 11,741,098 B2
(45) Date of Patent: Aug. 29, 2023

(54) METHODS AND SYSTEMS FOR STORING AND QUERYING DATABASE ENTRIES WITH NEUROMORPHIC COMPUTERS

(71) Applicant: Applied Brain Research Inc., Waterloo (CA)

(72) Inventors: Aaron Russell Voelker, Stittsville (CA); Christopher David Eliasmith, Waterloo (CA); Peter Blouw, Breslau (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 0 days.

(21) Appl. No.: 16/930,219

(22) Filed: Jul. 15, 2020

(65) Prior Publication Data
US 2021/0133190 A1     May 6, 2021

Related U.S. Application Data

(60) Provisional application No. 62/929,713, filed on Nov. 1, 2019.

(51) Int. Cl.
*G06F 16/24* (2019.01)
*G06F 16/2453* (2019.01)
(Continued)

(52) U.S. Cl.
CPC .... *G06F 16/24534* (2019.01); *G06F 16/2237* (2019.01); *G06F 16/284* (2019.01); *G06N 3/049* (2013.01); *G06N 3/063* (2013.01)

(58) Field of Classification Search
CPC .......... G06F 16/2237; G06F 16/24534; G06F 16/24569; G06F 16/284; G06N 3/0445; G06N 3/049; G06N 3/063
See application file for complete search history.

(56) References Cited

U.S. PATENT DOCUMENTS 6,189,002 B1 * 2/2001 Roitblat ................. G06F 16/30
2003/0131214 A1 * 7/2003 Downer ................ G06F 9/5061
712/15
(Continued)

OTHER PUBLICATIONS

He et al. "Constructing an Associative Memory System Using Spiking Neural Network", Jul. 2019 (Year: 2019).*
(Continued)

*Primary Examiner* — Eliyah S. Harper
(74) *Attorney, Agent, or Firm* — Jenna L. Wilson; Wilson Lue LLP

(57) ABSTRACT

The present invention relates to methods and systems for storing and querying database entries with neuromorphic computers. The system is comprised of a plurality of encoding subsystems that convert database entries and search keys into vector representations, a plurality of associative memory subsystems that match vector representations of search keys to vector representations of database entries using spike-based comparison operations, a plurality of binding subsystems that update retrieved vector representations during the execution of hierarchical queries, a plurality of unbinding subsystems that extract information from retrieved vector representations, a plurality of cleanup subsystems that remove noise from these retrieved representations, and one or more input search key representations that propagates spiking activity through the associative memory, binding, unbinding, cleanup, and readout subsystems to retrieve database entries matching the search key.

12 Claims, 2 Drawing Sheets

Figure 1:
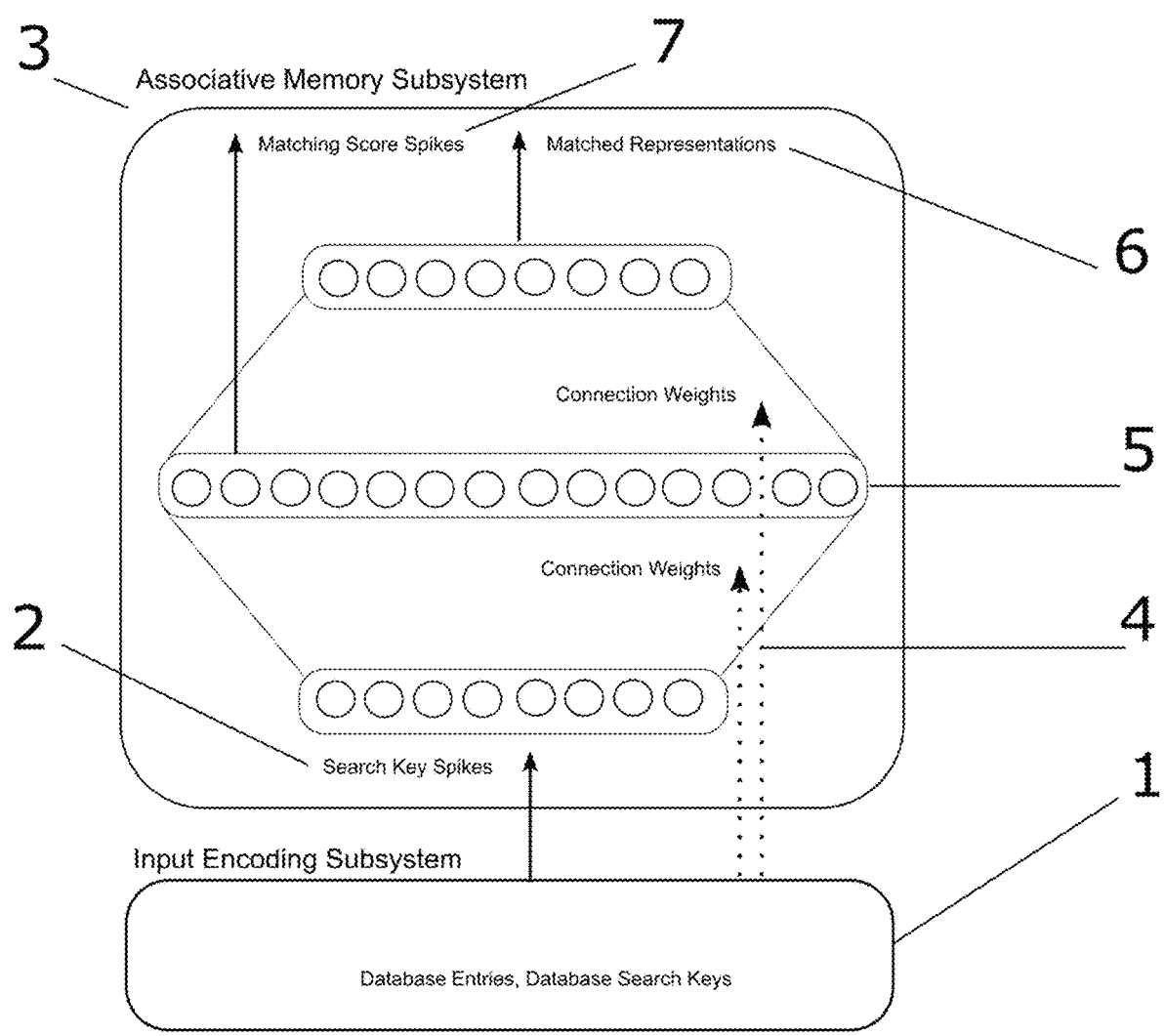

(51) Int. Cl.
*G06F 16/22* (2019.01)
*G06F 16/28* (2019.01)
*G06N 3/049* (2023.01)
*G06N 3/063* (2023.01)

(56) References Cited

U.S. PATENT DOCUMENTS

| | | | | |
|---|---|---|---|---|
| 2003/0219752 | A1* | 11/2003 | Short | C12Q 1/6881 435/7.1 |
| 2004/0241759 | A1* | 12/2004 | Tozer | B01L 3/5085 506/41 |
| 2005/0070005 | A1* | 3/2005 | Keller | G01N 33/569 506/41 |
| 2007/0172890 | A1* | 7/2007 | Prins | B82Y 5/00 435/7.1 |
| 2010/0312735 | A1* | 12/2010 | Knoblauch | G06N 3/0445 706/25 |
| 2012/0109863 | A1* | 5/2012 | Esser | G06N 3/08 706/25 |
| 2014/0156577 | A1* | 6/2014 | Eliasmith | G06N 3/10 706/26 |
| 2016/0147201 | A1* | 5/2016 | Crncich-Dewolf | G06N 3/049 700/45 |
| 2016/0155048 | A1* | 6/2016 | McCormick | G06N 3/04 706/27 |
| 2018/0322384 | A1 | 11/2018 | Charles et al. | |
| 2019/0042910 | A1* | 2/2019 | Krishnamurthy | G06N 3/049 |
| 2019/0220735 | A1* | 7/2019 | Sengupta | G06F 3/0659 |
| 2019/0251422 | A1* | 8/2019 | Ramanath | G06F 16/24578 |
| 2020/0118690 | A1* | 4/2020 | Cole, Jr. | G16H 30/40 |
| 2020/0126282 | A1* | 4/2020 | Moroze | G06T 19/00 |
| 2020/0272884 | A1* | 8/2020 | Paul | G06N 3/049 |

OTHER PUBLICATIONS

He et al. "Constructing an Associative Memory System Using Spiking Neural Network" (Year: 2019).*

Chun Zhang, Jeffrey Naughton, David DeWitt, Qiong Luo, and Guy Lohman. 2001. On supporting containment queries in relational database management systems. SIGMOD Rec. 30, 2 (Jun. 2001), 425-436. DOI:https://doi.org/10.1145/376284.375722.

Renzo Angles and Claudio Gutierrez. 2008. Survey of graph database models. ACM Comput. Surv. 40, 1, Article 1 (Feb. 2008), 39 pages. DOI:https://doi.org/10.1145/1322432.1322433.

M. Davies et al., "Loihi: A Neuromorphic Manycore Processor with On-Chip Learning," in IEEE Micro, vol. 38, No. 1, pp. 82-99, Jan./Feb. 2018, doi: 10.1109/MM.2018.112130359.

Paul A. Merolla et al., "A million spiking-neuron integrated circuit with a scalable communication network and interface" Science Aug. 8, 2014 : 668-673.

Thomas Heinis et al: "Neuromorphic Hardware as Database Co-Processors: Potential and Limitations", Jan. 1, 2019 (Jan. 1, 2019), XP055739896, DOI: 10.5441/002/edbt.2019.89 Retrieved from the Internet: URL:https://openproceedings.org/2019/conf/ edbt/EDBT19 paper 334.pdf.

Diguet Jean-Philippe et al: "Networked Power-Gated MRAMs for Memory-Based Computing" • IEEE Transactions on Very Large Scale Integration (VLSI) Systems, IEEE Service Center, Piscataway, NJ, USA, vol. 26. No. 12. Dec. 1, 2018 (Dec. 1, 2018), pp. 2696-2708, XP011702496, ISSN: 1063-8210, DOI: 10.1109/TVLSI. 2018.2856458.

* cited by examiner

METHODS AND SYSTEMS FOR STORING AND QUERYING DATABASE ENTRIES WITH NEUROMORPHIC COMPUTERS

(1) FIELD OF THE INVENTION

The present invention generally relates to the field of storing and querying information in databases. More specifically, the present invention relates to methods and systems for encoding database entries as vector representations in a neuromorphic computer, and selectively retrieving these entries using spike-based associative memory operations performed by the neuromorphic computer.

(2) BACKGROUND OF THE INVENTION

A significant number of industry-relevant computing tasks involve rapidly matching queries to information in databases at scale. Examples of such tasks include document searches, relational or graph database searches, and information retrieval more generally.

Numerous approaches to storing and querying information in databases exist in the prior art. For example, traditional relational databases contain large numbers of tables containing tuples of data that match particular items with particular attributes. These databases support flexible queries through the composition of set-theoretic operations that retrieve particular tuples of interest. Examples of such operations include intersections and unions of tables, along with selections of items on the basis of particular attribute values. Prior art document https://dl.acm.org/doi/pdf/10.1145/375663.375722 describes comparatively recent methods for efficiently performing queries defined with respect to containment relations that hold amongst elements and attributes stored within a relational database.

While relational databases store information solely in the form of linked attribute-value pairs, graph databases adopt a much more flexible storage format in which items are represented as nodes and relationships between items are represented as typed edges. The representational flexibility of graph databases allows for much more efficient retrieval with complex queries on hierarchical structures. For example, to find entries corresponding to specific businesses with CEOs under the age of 40, one can select nodes on the basis of a "business" attribute, follow the "CEO" edge to a node corresponding to a specific individual, and then follow the "age" edge to check for numbers below 40. Such link checking is much less time and memory intensive than the series of selections and intersections that would have to be performed using a relational database containing comparable information. Prior art document https://dl.acm.org/doi/pdf/10.1145/1322432.1322433 cm surveys a number of approaches to implementing graph databases.

The relational and graph database systems described in prior art are relatively well-developed from a functional perspective, but almost universally implemented on conventional computing devices that, due to their reliance on serial instruction processing, iterate over large sets of candidate matches to a given query. Even when tasks are parallelized over a cluster of computing devices, each node in the cluster carries out a form of sequential processing that bounds computation time by the number of iterations per node. Moreover, because the computational primitives made available by conventional devices are not directly designed for comparing queries to data, each comparison can involve a large number of instruction cycles. Constraints on query latency (due to sequential instruction bottlenecks) and energy efficiency (due to large instruction counts) are a central challenge facing database system designers.

Neuromorphic computing technologies are potentially applicable to solving this challenge due to their extensive use of architectural parallelization and their ability to perform efficient calculations of inner products (which are a kind of comparison operation, for instance being equivalent to the well-known "Cosine similarity" metric when using the L2 inner product with unit-length vectors). A single neuromorphic computer typically consists of a large interconnected mesh of neural processing elements that communicate with one another in parallel via discrete event-based payloads called spikes. Programming such a computer involves specifying connection weights, synaptic models, and neuron response properties that together determine the effect each spike has on its recipient neurons. Importantly, spike-based computation can significantly improve both latency and efficiency across a wide range of computational tasks: latency is improved as a result of architectural parallelism that reduces the number of steps required to transform inputs into outputs, while efficiency is improved as a result of event-driven computations in which payloads are communicated between processing elements in an workload-dependent manner. Prior art documents https://ieeexplore.iee.org/abstract/document/84259423 and https://science.sciencemag.org/content/345/6197/668 describe the design of two recently developed neuromorphic computers.

The primary way in which neuromorphic computers are programmed is by configuring the connection weight matrices between populations of neurons. This places important constraints on how they can be used to store and process database entries. Distributed vector representations are naturally processed using neuromorphic computers, and there are numerous existing methods for encoding both structured and unstructured data with such representations. For example, prior art document http://www2.fiit.stuba.sk/~kyasnicka/CognitiveScience/6.prednaska/plate.iee95.pdf describes methods for representing compositional structures of symbolic items using distributed vector representations. These methods use circular convolution to associate symbolic items represented by vectors via a form of variable binding. Circular convolution is a compression operation that enables the creation of a variety of different data structures including graphs, lists, and trees, all of which are represented in fixed-width vector representations.

However, the methods and systems described in the aforementioned prior art do not directly enable database entries to be stored and searched using the memory resources and computational operations made available by neuromorphic computers. More specifically, the prior art neither shows how to encode database entries in a neuromorphic computer nor how to use spike events to search over these entries to perform standard database queries.

The present application addresses this gap in the prior art by describing methods and systems for storing database entries in the connection weights entering individual neurons on a neuromorphic chip, and for querying these entries through an associative memory mechanism in which spikes corresponding to a search key are broadcast to all neurons in the memory, and the first k neurons to spike correspond to the top k entries in the database that match the key. When combined with subsystems that perform binding, unbinding, and cleanup with vector representations corresponding to database entries, this associative memory search mechanism

(3) SUMMARY OF THE INVENTION

In view of the foregoing absence of known methods for manipulating database entries with neuromorphic computers, the present invention provides methods and systems for storing and querying a wide range of data structures including singletons, tuples, graphs, and trees using spike-based computations in a neuromorphic associative memory. More specifically, the present invention introduces methods and systems for converting the aforementioned data-structures (and corresponding search keys) into vector representations, storing these vector representations as connection weights on a neuromorphic chip, and scoring the match between a search key and each vector representation by broadcasting a set of spikes encoding the search key through the connection weights for each database entry to compute a dot product. The magnitude of each dot product is determined by the time at which the corresponding neuron spikes, since a high dot product will cause the neuron to accumulate input and generate a spike quickly, while a low dot product will cause a slower accumulation that results in a later spike or no spike at all. Binding, unbinding, and cleanup subsystems are used to extract additional data from retrieved entries that can be used to perform recursive searches with the associative memory so as to implement graph traversals and other complex queries. As such, the general purpose of the present invention, which will be described subsequently in greater detail, is to provide methods and systems for storing and querying database entries with neuromorphic computers, and thereby go significantly beyond what is possible in the prior art.

Collectively, these features of the present invention introduce a number of desirable performance characteristics when compared to conventional database implementations. First, because each database entry may be encoded as a set of connection weights going into a single neuron, and because inputs can be communicated to every neuron in a neuromorphic system in parallel, many input-query matches are computed simultaneously. The implementation is therefore extremely fast with O(1) time-complexity. The insertion of new entries into the database is also of O(1) time complexity, since there is a constant cost for allocating an additional neuron and writing a new vector representation to its inbound connection weights. Second, because spikes may only be generated to encode the input query and to record the best entry matches, the implementation is extremely energy-efficient. Finally, because the number of database entries handled by the implementation scales linearly in the number of neurons, this invention demonstrates a practical, large-scale application of a neuromorphic computer. These and other advantages help the present invention perform significantly beyond what is defined in the prior art.

The main aspect of the present invention is to provide methods and systems for storing and querying database entries with neuromorphic computers. The methods and systems for storing and querying these database entries are comprised of a plurality of encoding subsystems that convert database entries and search keys into vector representations, a plurality of associative memory subsystems that match vector representations of search keys to vector representations of database entries using spike-based comparison operations, a plurality of binding subsystems that update retrieved vector representations during the execution of hierarchical queries, a plurality of unbinding subsystems that extract information from retrieved vector representations, a plurality of cleanup subsystems that remove noise from these retrieved representations, and one or more input search key representations that propagates spiking activity through the associative memory, binding, unbinding, and cleanup subsystems to retrieve database entries matching the search key.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

(4) BRIEF DESCRIPTION OF THE DRAWINGS

Figure 2:
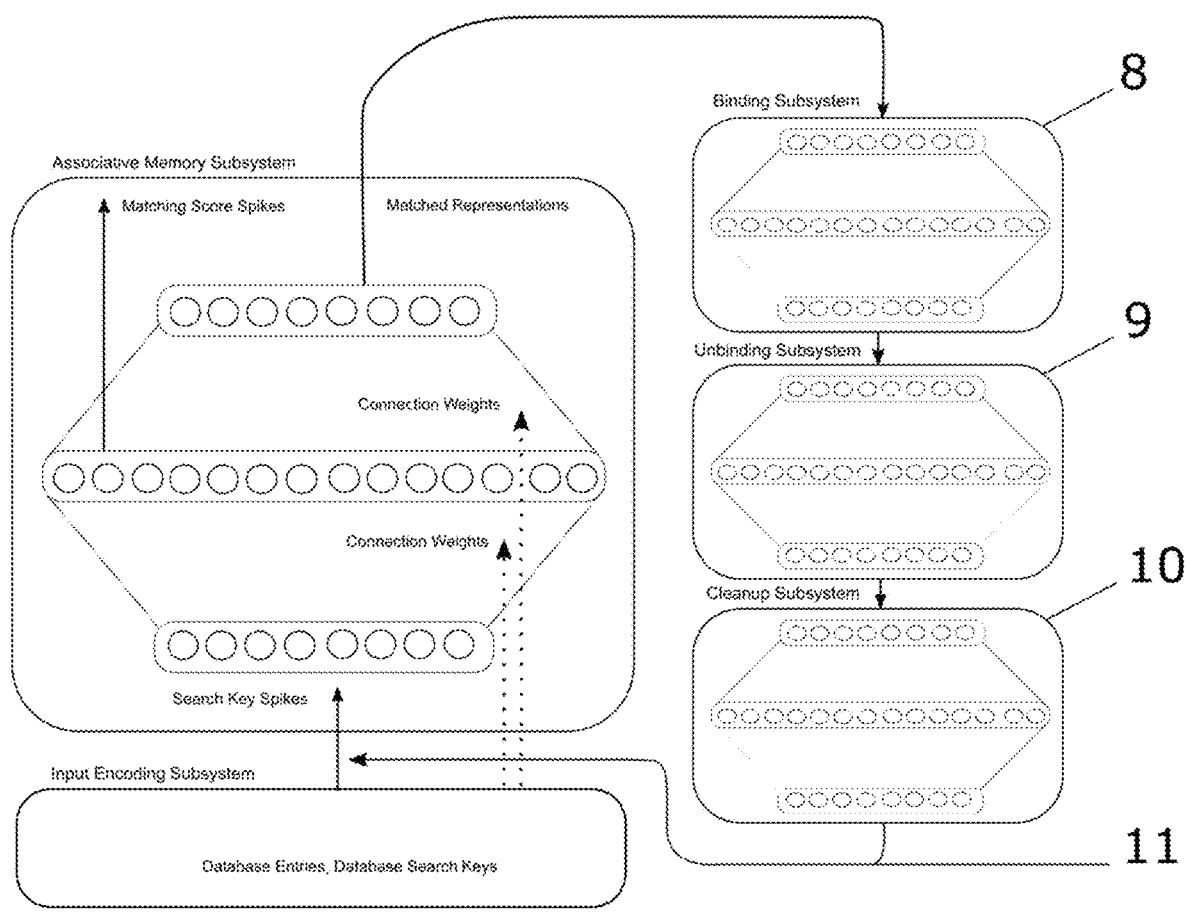

The invention will be better understood and objects other than those set forth above will become apparent when consideration is given to the following detailed description thereof. Such description makes reference to the annexed drawings wherein:

FIG. 1 is an illustration of the coupling between an input encoding subsystem and an associative memory subsystem, such that spikes produced by the associative memory subsystem score matches between vector representations of search keys and vector representations of database entries stored in the associative memory's connection weights; and FIG. 2 is an illustration of the coupling of between an input encoding subsystem, an associative memory subsystem, a binding subsystem, an unbinding subsystem, and a cleanup subsystem, such that multiple steps of database query processing can be performed through repeated, recursive, and/or sequential applications of these subsystems with one or more input representations.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein, the terms "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the digital circuits described herein may be implemented in configurable hardware (i.e., FPGA), custom hardware (i.e., ASICs), including neuromorphic hardware with at least one interface. The input signal is consumed by the digital circuits to perform the functions described herein and to generate the output signal. The output signal is provided to one or more adjacent or surrounding systems or devices in a known fashion.

As used herein the term 'neuron' refers to spiking neurons, continuous rate neurons, or arbitrary nonlinear components used to make up a distributed system.

The described systems can be implemented using adaptive or non-adaptive components. The system can be efficiently implemented on a wide variety of distributed systems that include a large number of nonlinear components whose individual outputs can be combined together to implement certain aspects of the system as will be described more fully herein below.

The main embodiment of the present invention is to provide methods and systems for storing and querying database entries with neuromorphic computers. The methods and systems for storing and querying these database entries are comprised of a plurality of encoding subsystems that convert database entries and search keys into vector representations, a plurality of associative memory subsystems that match vector representations of search keys to vector representations of database entries using spike-based comparison operations, a plurality of binding subsystems that update vector representations during the execution of hierarchical queries, a plurality of unbinding subsystems that extract information from retrieved vector representations, a plurality of cleanup subsystems that remove noise from these retrieved representations, and one or more input search key representations that propagates spiking activity through the associative memory, binding, unbinding, and cleanup subsystems to retrieve k database entries matching the search key.

The vector representations correspond here to a plurality of data structures and a plurality of human-interpretable data types. The plurality of data structures may include singletons, tuples, graphs, and trees. The plurality of human-interpretable data types may include images, audio, text, and webpages. The term 'representation' alone refers to either structured or unstructured representations. The neural network layers in the present invention refer to collections of neurons implemented on a neuromorphic chip that accumulate input from one or more other collections of neurons and propagates output to one or more other collections of neurons.

An 'input encoding subsystem' [1] here refers to a computational mechanism that converts an input data structure or human interpretable data type into a vector representation, and optionally then into a series of spikes [2]. The conversion of data into vector representations may involve any number of preprocessing techniques including dimensionality reduction, filtering, normalization, and rescaling. The conversion of data into vector representations may be performed using deep neural networks, trained in tandem with any of the aforementioned preprocessing techniques. The conversion of data into vector representations may be implemented in a conventional computing device or a neuromorphic computing device. The further spike encoding of vector representations may take the form of a rate code in which the rate at which certain spikes are produced corresponds to the magnitude of a specific vector element. Alternatively, the encoding may take the form of a timing code in which to time at which a certain spike is produced corresponds to the magnitude of a specific vector element. For example, a spike that occurs early in time could indicate a large value, while a spike that occurs late in time could indicate small value, or a negative value.

An 'associative memory subsystem' [3] refers here to a neural network with a set of input connection weights [4], a layer of neurons [5], and a set of output connection weights [4]. The rows in the input weight matrix are set to take on values corresponding to vector representations of database entries. The columns in the output weight matrix are set to take on values corresponding vector representations that are associated with each of the database entries and optionally provided as output [6]. When spikes corresponding to a search key are generated by an input encoding subsystem and broadcast through the input connection weights to each neuron, the internal state variable of each neuron increases in proportion to the dot product between the vector representation of the search key (as encoded by the input spikes) and the vector representation of a database entry (as encoded by the neuron's incoming connection weights). The magnitude of each dot product determines the time at which each neuron spikes, since a high dot product will cause the neuron to accumulate input and generate a spike quickly, while a low dot product will cause a slower accumulation that results in a later spike or a no spike at all. Given this relationship between spike times and dot products, the top k matches to the search key are "scored" by the first k neurons to spike [7], since the dot product is a measurement of how similar the search key is to each database entry. The rate at which each neuron spikes can also be used to score matches between queries and database entries, since the query is encoded as a constant input that forces each neuron to spike at a constant rate that is proportional to the dot product between the query vector and a database entry vector. Higher firing rates correspond to better scoring matches, while lower firing rates correspond to poor matches.

In addition to the two scoring mechanisms just described, a number of other approaches to scoring may also be incorporated into an associative memory network. The associative memory network may include a hierarchy of layers that utilize methods from locality sensitive hashing, such as random projections and space partitioning, in order to minimize the distribution of inputs throughout the neuromorphic system. Temporal filters, nonlinear dendritic compartments, or specific nonlinearities may be introduced into the network to perform more sophisticated matches against input queries. Recurrent connections may be introduced to process spikes from the associative memory over time, so as to perform more complex forms of match ranking or to reduce the amount of output data produced by the associative memory network that needs to be monitored. Comparison operations performed with recurrent, hierarchical, or temporally filtered associative memory networks may involve computing arbitrary functions between search keys and database entries.

A 'binding network' [8] here refers to a neural network whose connection weights implement a binding operation such as circular convolution, vector-derived transformation binding, or phasor binding. This binding operation is used to create pairwise bindings that link individual data elements to particular locations in a tuple, graph, or tree. These bindings are collected via superposition into a single vector representation. Bindings that represent a single tuple of m elements in a relational database can be defined as follows:

$$\text{TUPLE} = \sum_{i=1}^{m} \text{ATTRIBUTE}_i \circledast \text{VALUE}_i \qquad (1)$$

where ⊙ corresponds to a specific binding operation. Individual data elements in (1) may be represented as random unit-length vectors of dimension d, which ensures that the vector components are identically distributed, and that all of the vectors are approximately orthogonal to one another. Data element comparisons may be performed via the normalized dot product, which is close to zero for all approximately orthogonal vectors. Representations of bound entities may be structured to an arbitrary degree of complexity. Unstructured representations in the present invention may be random unit-length vectors of dimension d, which ensures that the vector components are identically distributed, and that all of the vectors are approximately orthogonal to one another. Structured representations include some number of simple representations as constituent parts.

An 'unbinding network' [9] here refers to a network that inverts binding operations to extract either the entity or entities corresponding to a particular attribute in a structured vector representation. For example, the value associated with a particular attribute in a tuple binding can be retrieved as follows:

$$\text{TUPLE} \odot \text{ATTRIBUTE}_i^{-1} \approx \text{VALUE}_i \quad (2)$$

where $\text{ATTRIBUTE}_i^{-1}$ may indicate the pseudo-inverse of the $\text{ATTRIBUTE}_i$ representation. Alternatively, the exact inverse can be used if the constituent vectors in a structured representation are unitary.

A vector decoded from an unbinding operation is often noisy and only somewhat similar to the vector corresponding to the matching attribute value. A 'cleanup network' [10] here refers to a network that matches a noisily decoded vector to its clean counterpart. A cleanup network implements this matching either using closed-form functions (e.g., max) or neural networks. If too much noise is present in a decoded vector, a cleanup network will produce an incorrect match, leading to erroneous processing that produces incorrect database retrievals. The degree of noise present during decoding is determined both by the complexity of the representational structure being decoded, and by the amount of compression loss introduced by the binding operation being used.

To perform relational database queries using a combination of the aforementioned networks and subsystems, database entries are first converted into vector representations and then stored in an associative memory's connection weights. A traditional relational database consists of large numbers of tables containing tuples of data that match particular items with particular attributes. To store these tables in one or more associative memories, each tuple is represented as a high-dimensional vector of the sort described in Equation 1 above. To perform queries on these tuple representations, search keys are provided as input to the associative memory systems so as to retrieve items in accordance with the output of standard set-theoretic database operations such as selections, unions, and intersections. Selection operations, for instance, can be accommodated by providing a query in the form of a specific attribute-value pair that defines the selection. If a database contained the following tuple encodings:

$$\text{PERSON}_A = \text{AGE} \odot 25 + \text{COUNTRY} \odot \text{USA} \quad (3)$$

$$\text{PERSON}_B = \text{AGE} \odot 57 + \text{COUNTRY} \odot \text{AUS} \quad (4)$$

$$\text{PERSON}_C = \text{AGE} \odot 57 + \text{COUNTRY} \odot \text{UK} \quad (5)$$

then a selection on the basis of the 'age' attribute, would be performed as follows:

$$f_{associate}(\text{AGE} \lfloor 57) \approx \text{PERSON}_B + \text{PERSON}_C \quad (6)$$

Where f associate indicates the application of the associative memory with an input search key that encodes $\text{AGE} \odot 57$. The reason this method is effective is because the search key will produce a high inner product only with those entries that include $\text{AGE} \odot 57$ as an attribute-value pair, since $\text{AGE} \odot 57 \cdot \text{AGE} \odot 57 \approx 1$. Composite queries that combine intersections with selections and projections can be implemented through recursive applications of the associative memory [11].

To perform graph database queries using the aforementioned networks and subsystems, database graph nodes are again first converted into vector representations and then stored in an associative memory's input weight matrix. Each vector representation again encodes a set of attribute-value pairs, but the attributes in question correspond to edge types and the values in question correspond to other nodes accessible via these edge types. Traversing an edge in the graph involves passing vectors corresponding to a particular node and edge-type through an unbinding network, and then using an associative memory to match the output of this network to the vector encoding the edges of the traversed-to node. For example, to find entries corresponding to specific businesses with CEOs under the age of 40, one can select nodes on the basis of a "business" attribute, follow the "CEO" edge to a node corresponding to a specific individual, and then follow the "age" edge to check for numbers below 40. Such link checking is much less time and memory intensive than the series of selections and intersections that would have to be performed using a relational database containing comparable information. In mathematical terms, the nodes in the graph might be represented as follows:

$$\text{BUSINESS}_A = \text{CEO} \odot \text{CEO}_A + \text{INDUSTRY} \odot \text{SHIPS} \quad (7)$$

$$\text{BUSINESS}_B = \text{CEO} \odot \text{CEO}_B + \text{INDUSTRY} \odot \text{AUTOS} \quad (8)$$

$$\text{BUSINESS}_C = \text{CEO} \odot \text{CEO}_C + \text{INDUSTRY} \odot \text{PLANES} \quad (9)$$

$$\text{CEO}_A = \text{AGE} \odot 43 + \text{NAME} \odot \text{JOHN} + \text{DEGREE} \odot \text{MBA} \quad (10)$$

where each 'role' representation (e.g. CEO) in the encoding corresponds to an edge in the graph, and each filler (e.g., $\text{CEO}_A$) corresponds to another node. A query for the age of a particular business's CEO would be performed as follows:

$$f_{associate}(\text{BUSINESS}_A \odot \sim \text{CEO}) \approx \text{CEO}_A \quad (11)$$

$$f_{associate}(\text{CEO}_A \odot \sim \text{AGE}) \approx 43 \quad (12)$$

where cleanup operations are used to remove the noise in the decoded outputs of the associative memory. In this case, the value associated with the CEO attribute in the $\text{BUSINESS}_A$ graph node encoding is being retrieved, after which the value associated with the AGE attribute in the retrieved $\text{CEO}_A$ representation is extracted.

Multiple methods may be used to encode and manipulate graphical data structures with neuromorphic computing devices. Potential encoding schemes may involve representing nodes and edges as simple attribute-value pairs, weighted attribute-value pairs, or attribute-value pairs corresponding to random walks over a graph from a given starting point. Potential traversal and inference schemes may involve recursive associative memory lookups intermingled with the binding and unbinding operations, or recursive associative memory lookups intermingled with other operations, either on a neuromorphic or a non-neuromorphic computing device. Scaling to large graphs with tens or hundreds of edges connecting to a given node may involve the use of multiple associative memories and routing or control flow algorithms to determine which associative memories to use in which contexts.

Further embodiments of the innovation may be used for text, webpage, audio, video, and image retrieval, or for processing network traffic data, financial data, and sensor data. To handle text retrieval, for instance, it is possible to represent documents as normalized sums of word vectors computed using a variety of off-the-shelf methods. The vectors encoding individual documents can then be stored as incoming connection weights to specific neurons, and, for example, the top-k-to-spike retrieval mechanism can be used to match vector representations of text queries to particular documents in an efficient and rapid manner.

The individual computing elements within the networks used to implement associative memory operations, binding operations, unbinding operations, and clean-up operations are implemented using neuromorphic hardware that physically instantiates spike-based communication between computing elements. The input processing in the present invention with vector representations of database entries and search keys can involve arbitrary sequences of binding, unbinding, and cleanup operations, each of which are implemented by binding networks, unbinding networks, and cleanup networks, respectively. The same networks may be used repeatedly by communicating the outputs of one network to the input of another network in arbitrary sequential order [11]. Optionally, multiple networks may be coupled to one another in arbitrary sequential order.

The components can be implemented using a combination of adaptive and non-adaptive components. The system can be efficiently implemented on a wide variety of distributed systems that include a large number of nonlinear components whose individual outputs can be combined together to implement certain binding and unbinding operations. Examples of nonlinear components that can be used in various embodiments described herein include simulated/artificial neurons, FPGAs, GPUs, and other parallel computing systems. Components of the system may be implemented using a variety of standard techniques such as by using microcontrollers. In addition, optionally nonlinear components may be implemented in various forms including software simulations, hardware, or any neuronal fabric.

To implement binding, unbinding, transformation, and cleanup networks with spiking neurons, the standard leaky integrate-and-fire (LIF) neuron model may be used in all network layers. Optionally, other spiking neuron models may be used. The vectors corresponding to the queries and database entries that initially provide input to the system are encoded into spiking activities by injecting a current J into an input encoding neuron. This current is proportional to the similarity between the supplied input vector and a vector that characterizes the 'preferred' vector of the neuron. The activity of a neuron can be calculated based on the input current, J, and a nonlinear neuron model G, yielding the activity of each neuron $a_i$ as:

$$A_i = G[J] \quad (12)$$

The input representations to the system in the present invention are either discrete or continuous in time. The binding, the unbinding, the transformation, and the cleanup networks may be implemented repeatedly, recursively, and/or sequentially to perform multiple steps of database query processing.

The method for storing and querying database entries with a neuromorphic computer, wherein said method is comprised of the following steps:
i. defining a plurality of encoding subsystems that convert database entries and database search keys into vector representations and spike encodings of these vector representations;
ii. defining a plurality of associative memory subsystems that store vector representations of database entries in the connection weights between simulated neurons implemented on the neuromorphic computer;
iii. defining at least one search key that is encoded into spikes that are propagated through the connection weights in the associative memory system to produce output spikes in simulated neurons on the neuromorphic computer whose timings, rates, or filtered outputs score the match between the search key and the database elements.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

The invention claimed is:

1. A system for storing and querying database entries with a neuromorphic computer, comprising:
a plurality of encoding subsystems that convert database entries and database search keys into vector representations and spike encodings of said vector representations;
a plurality of associative memory subsystems that store said vector representations of database entries in connection weights between simulated neurons implemented on the neuromorphic computer;
and one or more search keys encoded into spikes that are propagated through the connection weights in the associative memory system to produce output spikes in simulated neurons on the neuromorphic computer whose relative spike times, firing rates, or filtered outputs, score a match between the search key and database elements;
wherein a plurality of binding subsystems that bind one vector representation to another vector representation, and a plurality of unbinding subsystems that extract said one vector representation from said another vector representation are connected to inputs and/or outputs of one or more associative memory systems that encode vector representations of database entries;
and wherein input processing with said vector representations of database entries and said search keys involve arbitrary sequences of binding by said binding subsystems and arbitrary sequences of unbinding by said unbinding subsystems.

2. The system according to claim 1, wherein said plurality of associative memory subsystems include hierarchical layers, recurrent connections, and/or temporal filters between simulated neurons to compute matches between database elements and search keys.

3. The system according to claim 1, wherein a plurality of cleanup subsystems that match noisy or corrupted vectors to their counterparts are connected to the output of the plurality of unbinding subsystems.

4. The system according to claim 1, wherein said encoding, said associative memory, said binding, and said unbinding subsystems are implemented repeatedly, recursively, and/or sequentially.

5. The system according to claim 3, wherein relational database entries are encoded as vector representations of attribute-value pairs, and vector representations of search keys are used to perform standard database queries corresponding to operations including intersection, union, and selection via sequences of binding, association, unbinding, and cleanup operations.

6. The system according to claim 3, wherein graphical database entries are encoded as vector representations of attribute-value pairs, and vector representations of search keys corresponding graph edges are used to perform standard graph traversal queries via sequences of binding, association, unbinding, and cleanup operations.

7. The system according to claim 1, wherein said neuromorphic computer consists of a plurality of nonlinear components, and each one of said plurality of nonlinear components is configured to generate an output in response to said vector representations, and wherein said output from each said plurality of nonlinear components is weighted by coupling weights of corresponding weighted couplings and weighted outputs are provided to coupled network layers, and wherein said vector representations and coupling weights correspond to a plurality of data structures and a plurality of human-interpretable data types.

8. A method for storing and querying database entries with a neuromorphic computer comprising:
  i. defining a plurality of encoding subsystems that convert database entries and database search keys into vector representations and spike encodings of said vector representations;
  ii. defining a plurality of associative memory subsystems that store said vector representations of database entries in connection weights between simulated neurons implemented on the neuromorphic computer;
  iii. defining at least one search key that is encoded into spikes that are propagated through the connection weights in the associative memory system to produce output spikes in simulated neurons on the neuromorphic computer whose relative spike times or firing rates or filtered outputs score a match between the search key and database elements;
  iv. defining a plurality of binding subsystems that bind one vector representation to another vector representation, and a plurality of unbinding subsystems that extract said one vector representation from said another vector representation, and which are connected to inputs and/or outputs of one or more associative memory systems that encode vector representations of database entries;
    wherein input processing with said vector representations of database entries and said search keys involve arbitrary sequences of binding by said binding subsystems and arbitrary sequences of unbinding by said unbinding subsystems.

9. The method for storing and querying database entries with a neuromorphic computer according to claim 8, comprising defining associative memory subsystems that include hierarchical layers, recurrent connections, and/or temporal filters between simulated neurons to compute matches between database elements and search keys.

10. The method for storing and querying database entries with a neuromorphic computer according to claim 8, comprising defining sequential or recursive applications of any number of associative memory, binding, unbinding, and cleanup sub systems.

11. The method for storing and querying database entries with a neuromorphic computer according to claim 8, comprising encoding relational database entries and search keys as vector representations of attribute-value pairs in order to perform standard database queries corresponding to operations including intersection, union, and selection via sequences of binding, association, unbinding, and cleanup operations.

12. The method for storing and querying database entries with a neuromorphic computer according to claim 8, comprising encoding graphical database entries and graph edges as vector representations are used to perform standard graph traversal queries via sequences of binding, association, unbinding, and cleanup operations.

\* \* \* \* \*